US010207869B2

(12) United States Patent
Kapuria et al.

(10) Patent No.: US 10,207,869 B2
(45) Date of Patent: Feb. 19, 2019

(54) WAREHOUSE MANAGEMENT SYSTEM (71) Applicant: THE HI-TECH ROBOTIC SYSTEMZ LTD, Gurugram (IN)

(72) Inventors: Anuj Kapuria, Gurugram (IN); Ritukar Vijay, Gurugram (IN); Fahad Munawar Azad, Gurugram (IN); Kvn Pradyot, Gurugram (IN)

(73) Assignee: THE HI-TECH ROBOTIC SYSTEMZ LTD, Gurugram (IN)

( * ) Notice: Subject to any disclaimer, the term of this patent is extended or adjusted under 35 U.S.C. 154(b) by 0 days.

(21) Appl. No.: 15/593,315

(22) Filed: May 11, 2017

(65) Prior Publication Data
US 2018/0251300 A1  Sep. 6, 2018

(30) Foreign Application Priority Data
Mar. 3, 2017  (IN) .............................. 201711007525

(51) Int. Cl.
| B65G 1/137 | (2006.01) |
| B65G 1/04 | (2006.01) |
| B25J 9/16 | (2006.01) |
| B65G 1/06 | (2006.01) |
| G06Q 10/08 | (2012.01) |
| G06Q 50/28 | (2012.01) |

(52) U.S. Cl.
CPC ............ *B65G 1/137* (2013.01); *B25J 9/1664* (2013.01); *B65G 1/0492* (2013.01); *B65G 1/065* (2013.01); *G06Q 10/08* (2013.01); *G06Q 50/28* (2013.01)

(58) Field of Classification Search
USPC .......................................... 700/218
See application file for complete search history.

(56) References Cited

U.S. PATENT DOCUMENTS

| 2007/0290040 A1* | 12/2007 | Wurman | .............. G06Q 10/087 235/385 |
| 2014/0288696 A1* | 9/2014 | Lert | ..................... B65G 1/0492 700/216 |
| 2017/0347624 A1* | 12/2017 | Jorgensen | ............ G05D 1/0272 |

* cited by examiner

*Primary Examiner* — Kyle O Logan (57) ABSTRACT

A warehouse management system (102), an autonomous mobile robot (AMR) (106), and a handheld device (HHD) (108) consolidate orders at a warehouse received from users. A first percentage of orders may be consolidated from at least one regular zone of the warehouse within a predetermined time period. A second percentage of the orders may be consolidated from a manual zone of the warehouse when the first percentage of the orders cannot be consolidated within the predetermined time period Further, a remaining or a third percentage of the orders may be consolidated from the at least one regular zone or the manual zone in a next iteration of the AMR (106) when at least one item of the plurality of orders is not available in the warehouse.

8 Claims, 7 Drawing Sheets

WAREHOUSE MANAGEMENT SYSTEM

This application claims priority to the Indian Patent Application No. 201711007525 with the filing date of Mar. 3, 2017, the content of which is incorporated by reference in its entirety herein.

FIELD OF THE INVENTION

The present invention relates to management of warehouses and particularly to a system and method for managing a ware house and more specifically a multi-level warehouse.

BACKGROUND OF THE INVENTION

With the advent of e-commerce, consumers can browse through millions of products and order from anywhere on the globe if they are connected to the internet. E-commerce has made available an unprecedented number of product options to the consumer which can be viewed and ordered through a digital device from the comfort of home, office or on the go, while travelling.

Since the sellers on the internet has literally offered the customer the whole world to choose from, they have also taken over the cumbersome task of maintaining and managing a warehouse which stores the products which are being offered for sale. Even a simple product like a bathing soap may have more than 100 different variations depending upon the brand and size/weight.

There have been attempts to automate the management of stock in the warehouse but because of the enormous number of orders being placed at lightning speed via the internet and the continuous endeavour by the seller to deliver the products to the customer within the shortest possible time to the customer to outdo the competition (which includes the store next door), warehouse design and management has remained a challenge.

Warehouses are expected to frequently execute transactions which are user generated and include products from completely unrelated categories, and handle and store nearly an infinite number of products. However, these warehouses have very minimal time to process the orders with almost no margin for error.

An important aspect while designing a warehouse and storing and managing stock units in the ware house is the optimizations of the layout of the ware house so that the distance traveled by the operator/robot in the warehouse is minimized. Many researchers model this as a traveling salesman problem. Attempts have been made to reduce the order picking time based on volumes or turnover storage policies. Most frequently ordered items are placed close to the front of the picking zones. This uses historical information to determine the number of picks and other attributes. This has proven ineffective because of the ever changing markets and demands and continual launches of new products in the market.

While researchers have been concentrating on placement and location of similar and like items together based upon the historical orders, little attention has been paid to the actual design and layout of the warehouse to reduce the travel time within the warehouse irrespective of the nature of the orders and placement and location of the items in the ware house.

Therefore there is a need for a system to manage a warehouse, which reduces the pick and delivery time by reducing the total path to be traversed irrespective of the placement and location of the stock items.

OBJECTS OF THE INVENTION

It is an object of the invention to provide a system for managing a multilevel warehouse which reduces the total path to be traversed while accessing the wares within the warehouse.

It is another object of the invention that the system for managing warehouse optimizes the design and layout of the warehouse to reduce the total path that needs to be traversed while consolidation of orders and stocking of the warehouse and at the same time reduces the cost involved.

SUMMARY OF THE INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The present invention discloses a system for managing a multi-level warehouse, the system includes a ware house path for providing accessibility to wares of the warehouse, a plurality of robots having handling means for handling wares and moving means for traversing the ware house path, a control unit for managing the activities of the robots and a wireless communication network for transfer of warehouse information between the robots and control unit. The ware house path includes a level path at each level of the warehouse for accessing the wares in that level and a set of ramps for connecting the different level paths at each level of the warehouse. The level path at each level includes a set of guide rails located in the aisles of the warehouse, and a set of platforms connecting the guide rails. The control unit includes a route calculating module for calculating a best route to be traversed by the robots while handling wares based upon the real time status information of the warehouse.

Therefore, the present invention provides a system for managing a multi level warehouse so that the path which needs to be traversed by the robots while handling the wares for order consolidation and stocking of the warehouse is minimized.

These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTIONS OF THE DRAWINGS

For a better understanding of the embodiments of the systems and methods described herein, and to show more clearly how they may be carried into effect, reference will now be made, by way of example, to the accompanying drawings, wherein like reference numerals represent like elements/components throughout and wherein.

DETAILED DESCRIPTION

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
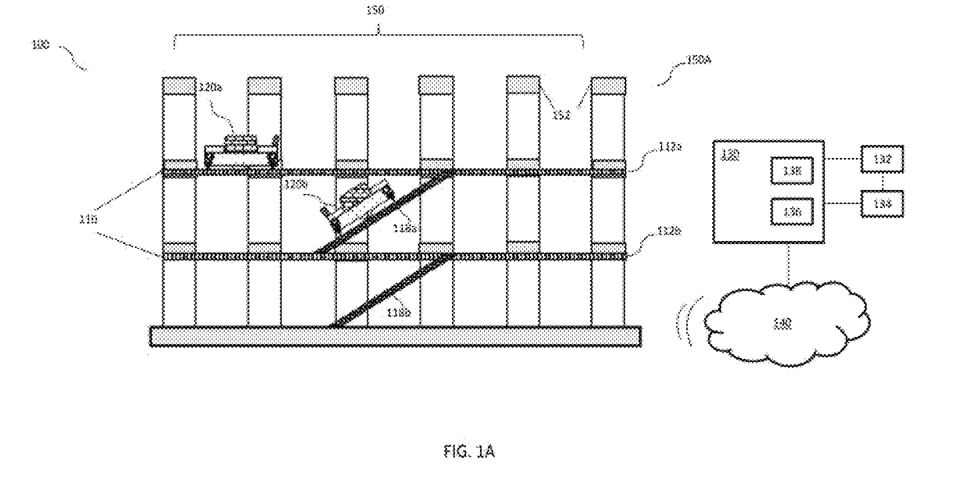
FIG. 1A illustrates a system for managing a multi-level warehouse in accordance with an embodiment of the invention, also shows the warehouse in the front view
Figure 1B:
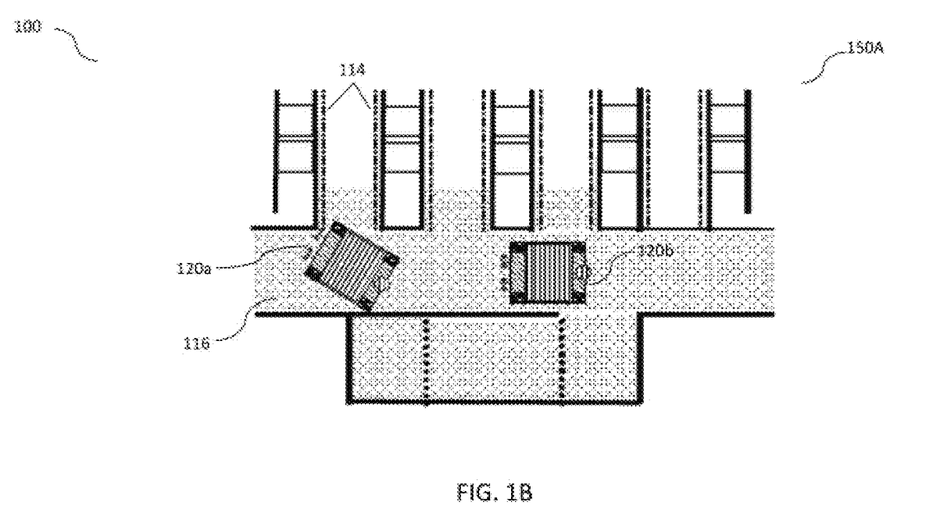
FIG. 1B shows the same in the top view.

FIG. 1A illustrates a system 100 for managing a multi-level warehouse 150 in accordance with an embodiment of the invention also shows a front view 150A and FIG. 1B shows a top view 150B of the warehouse 150. System 100 includes a ware house path 110 for providing accessibility to the wares in the shelves of the warehouse 150, robots 120a and 1204b configured to move along the path 110 for handling the wares, a control unit 130 for managing the activities of the robots 120 including movement within the warehouse 150 and handling of the wares by the robots 120, and a wireless communication network 140 for enabling sharing of warehouse information among the robots 120 and the control unit 130.

Warehouse path 110 includes a level path 112 at each of the levels (here, two levels shown in the FIG. 1A) of the multi-level warehouse 150. Each level path 112a and 112b connects and provides accessibility to the wares in shelves 152 at the corresponding level of the warehouse 150. Level path 112a connects and provides accessibility to the shelves at a first level of the ware house 150 and level path 112b to a corresponding second level of the ware house 150.

Each level path 112 includes a set of guide rails 114 which include as many pairs of guide rails as the number of aisles in the warehouse 150. Four pairs of guide rails 114 are located in the four aisles of the ware house 150 and provide a predefined path for the robots 120 while traversing through the aisles. Each level path 112 also includes platforms connecting the guide rails at the same level. Level path 112a includes a platform 116a connecting the four pairs of guide rails 114a at the same level in the warehouse 150. Platform 116a provides connection among the aisles to enable the robots 120 to move between the four aisles. Platform 116a is provided at one of the ends of the aisles.

It may be apparent that an additional platform (not shown) may also be provided at the other end for optimal performance depending upon the design constraints such as available real estate space, length of the aisles and the like.

Warehouse path also includes a set of ramps 118 for connecting the various levels of the ware house 150. Ramps 118 are inclined surfaces connecting one or more of the levels in the ware house 150 to an adjacent level above or below. Ramps 118 provide path for the movement of the robots 120 between various levels of the warehouse 150. It may be apparent that depending upon the design considerations such as real estate space available, length of aisles and the like, more than one ramp may be provided in an aisle for connecting the adjacent levels. In an embodiment, at least one ramp is provided in each aisle to connect adjacent levels. Ramps 118 enable to optimize the time and path the robots 120 travel in the ware house by enabling the robots to change levels from within the aisles rather than travelling to the end of the aisle to the platform and subsequently waiting for a lift to carry the robots to the desired level.

Figure 2:
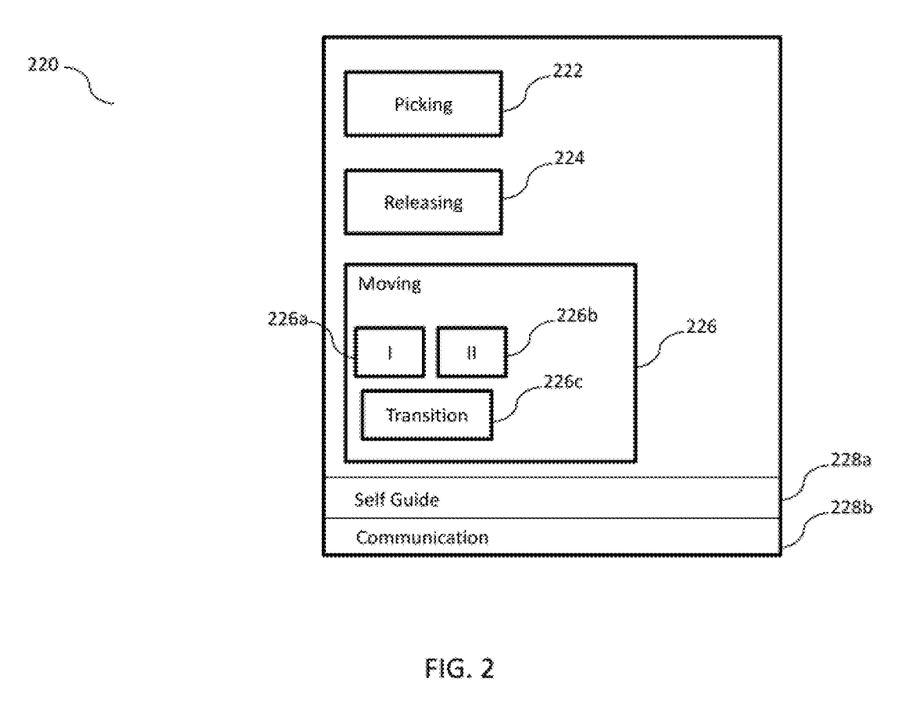
FIG. 2 is a bock diagram illustrating the structure of the robots of the system for managing the multi-level warehouse in greater details in accordance with an embodiment of the invention.

Reference is now made to FIG. 2 to explain the structure of robots 120 in greater detail. FIG. 2 shows a robot 220 similar to robots 120. Robot 220 includes means 222 for picking and means 224 for releasing the wares and also means 226 for moving the robots on the warehouse path. Means for picking and releasing may be in the form of pair of flexible motorized arms with sensors to identify, grip, move and release the wares from one location to the other. Robots 120 use the means for picking and releasing the wares to stock the warehouse by placing the items at designated shelves and also to consolidate orders by reaching the shelves and removing the wares from the shelves.

Means 226 for moving the robot 220 includes a first means 226a for moving the robot on plain surfaces such as the ground, platforms 116 and ramps 118 and second means 226b for moving on the guide rails 114 in the aisles of the warehouse 150. Robot 220 also includes a transition means 226c for shifting from the first means to the second means depending upon the path to be traversed. Second means 226b may be a set of rail wheels for traveling on the guide rails and first means 226a may be another set of ground wheels for travelling on the ground surfaces such as the ramp and the platform. As the robot 220 approaches to enter a desired aisle, the robot 220 takes an on-axis turn and aligns with the aisle, the transition means 226*c* change the drive of the robot from the ground wheels to the rail wheels. Conversely, as the robots come out of the aisle the transition means enable the ground wheel drive to take over.

Robot 220 includes a self-guided mobile module 228*a* to enable the robot 220 to traverse the warehouse path while following the best route. Self guided mobile module uses known methods such as optical identification marks and RFID indicators to follow the best route. Robots 220 use the self-guided module to change direction and recalculate the best route when faced with unforeseen obstructions such as fallen off item in the path, probable clash with another robot, non availability of ramp or lift and the like.

Robots 220 also includes a robot communication module 228*b* to enable communication with the control unit 130 and share the warehouse information including robot status, location etc. via the wireless communication network 140.

System 100 further includes one or more lifts connecting the various levels of the ware house 150. The location and number of lifts is chosen depending upon design considerations to optimize the cost and time required for traversing the best route by the robots 120. A few example embodiments have been shown in FIGS. 3 and 4. Since system 100 provides both ramps 118 and lifts, the robots 120 have a choice of using either one of the two while traversing the best route on the warehouse path. This optimizes the time and distance travelled by the robots and in effect reduces the time and increases the efficiency. Lifts include a lift communication module to communicate with the control unit 130 via the communication network 140 to share warehouse information including status of the lift, location of the lift, availability of the lift and the like.

Referring again to FIG. 1A, system 100 further includes an input module 132 for feeding the warehouse information to the control unit 130, a storage unit for storing the warehouse information and means for interaction among the control unit 130, input module 132 and the storage unit 134. The warehouse information may include ware location information, warehouse map, delivery location information, order information, stock information, and required wares list.

Control unit 130 is wirelessly connected through the wireless communication network 140 to communicate with the robots 120. A user may feed the data regarding the wares to be picked or placed in the shelves of the warehouse 150 through input means into the control unit 130. Control unit 130 has a calculating module 136 for calculating the best route the robots need to traverse to optimize the resources. The best route is communicated to the robots 120 via the communication network 140.

Control unit 130 includes an updating module 138 for providing real time status information of the various elements of the system 100 to the control unit 130. Real time status information may include information relating to status of the robots (robot clash, robot down, robot obstruction etc.), status of the warehouse path (obstruction due to item fall, oil spill etc.) and the like. Real time status information is used by the calculating module 136 to calculate and update the best route to be traversed by the robots and communicate the best route to the robots 120 via the wireless communication network 140.

A user may input the ware house information including the ware house map, structure, shelves location, ware house path design, ware house design and the like through the input means into the control unit. A required ware list or a stocking list is fed into the system. The calculating module 136 calculates the best path to be traversed by the robots to consolidate the order or stock the items in the warehouse 150. Calculating module 136 may use known algorithms to calculate the best route and communicate the same to the robots 120.

In an embodiment, the calculating module 136 may only communicate a part of the list of required wares and a part of the list of items to be stocked in the warehouse to an individual robot and each robot subsequently performs the operation of calculating the best route to be traversed individually based upon the part of the list provided. The robots may consider ware house information such as battery status and obstructions in the warehouse path while calculating the best route to be traversed.

System 100 may be used for stocking of the ware house 150 with the items required to be stored in the ware house. While storing the items in the ware house, the user may decide upon different a storage policies such as of storing related items together in adjacent shelves and of storing more frequently required/ordered items closer to the delivery station.

Figure 3:
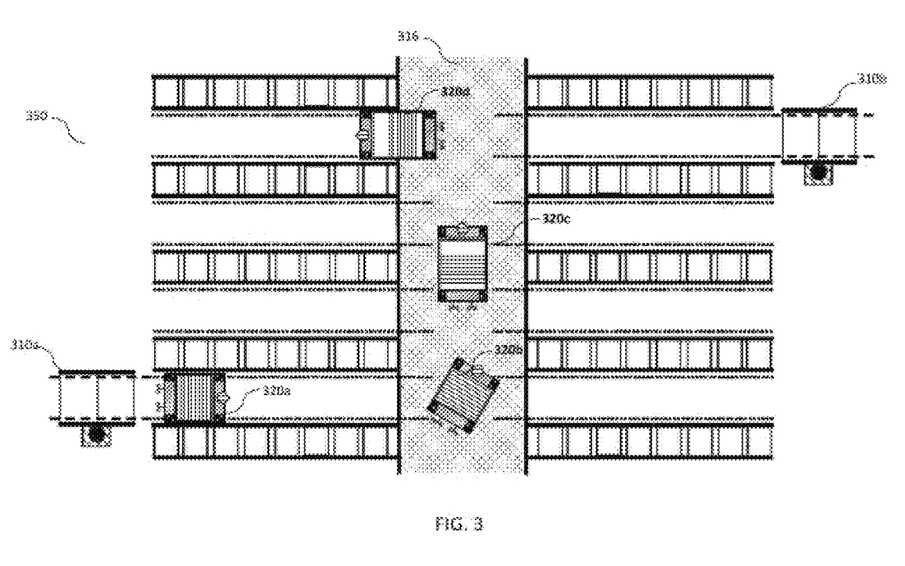
FIGS. 3 and 4 illustrate various embodiments of the system for managing the multilevel warehouse wherein examples of the structure and design of the multilevel warehouse are shown.
Figure 4:
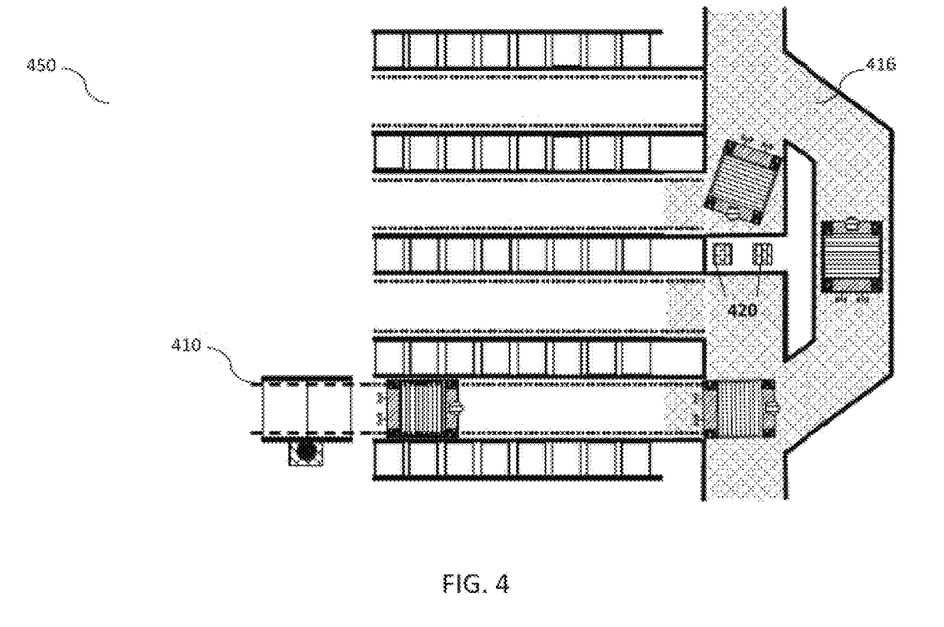
Figure 5:
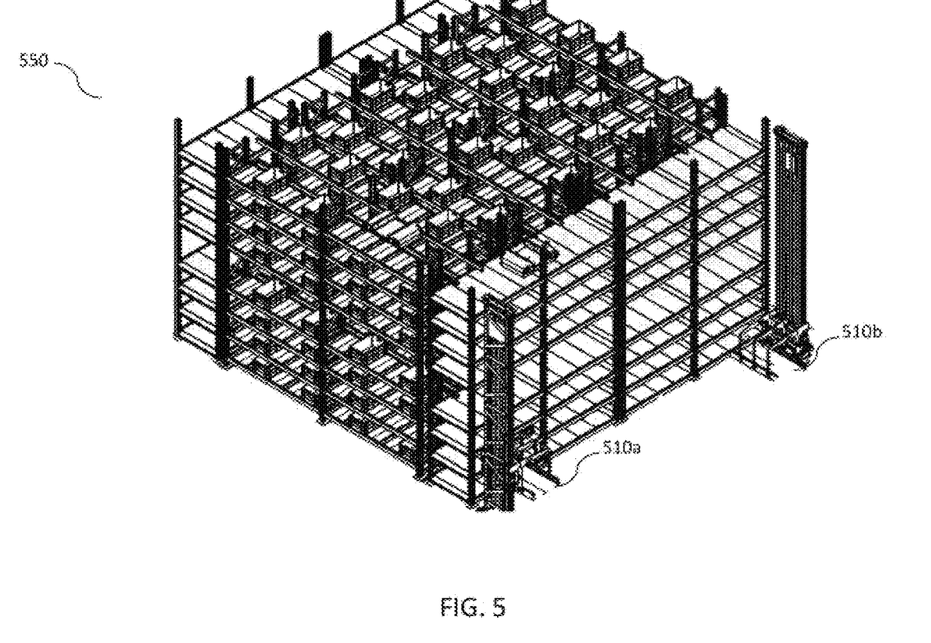
FIGS. 5 and 6 are block diagrams illustrating a perspective and top views of a system with two lifts in accordance with an embodiment of the invention.
Figure 6:
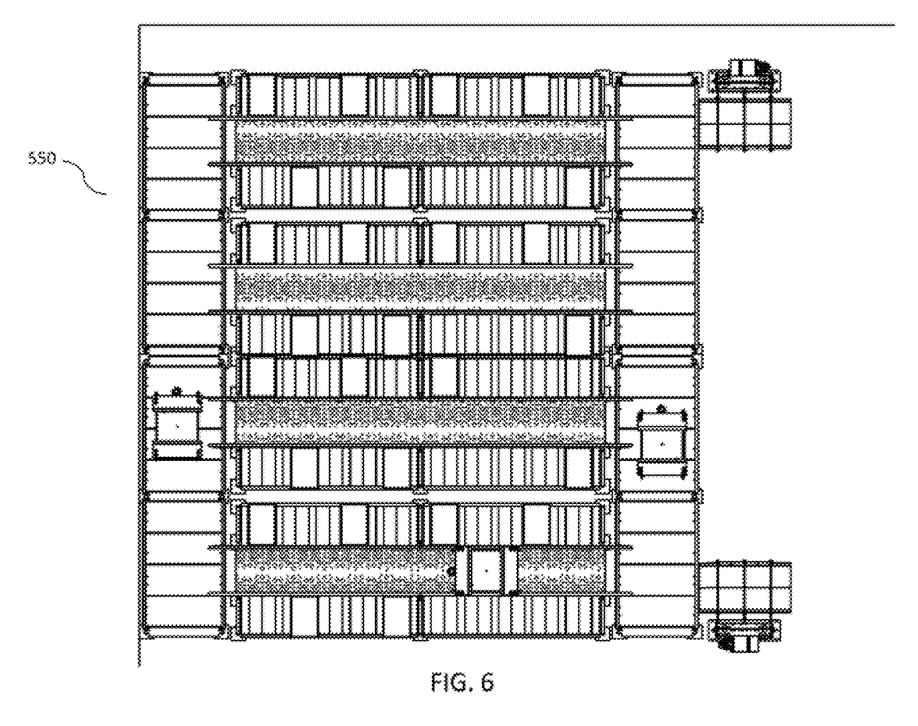

FIGS. 3-6 illustrate various embodiments of the system 100. FIG. 3 illustrates system 300 wherein the four robots 320*a-d* can traverse between the aisles using a common platform 316 in the middle of the warehouse 350 and two lifts 310*a* and 310*b* are provided at two diagonally opposite corners of the warehouse 350. FIG. 4 illustrates system 400 wherein a single lift 410 is provided at one corner of the warehouse 450 and a platform 416 has been designed to allow for the real estate obstruction such as the pillars 420. FIG. 5 illustrates system 500 wherein two lifts 510*a* and 510*b* are provided at different corners of the warehouse 550 in a perspective view. FIG. 6 illustrates a top view of the system 500.

It will be apparent to those having ordinary skill in this art that various modifications and variations may be made to the embodiments disclosed herein, consistent with the present disclosure, without departing from the spirit and scope of the present disclosure. Other embodiments consistent with the present disclosure will become apparent from consideration of the specification and the practice of the description disclosed herein.

We claim:

1. A system for managing a multi-level warehouse, the system comprising:
    a. a warehouse path for providing accessibility to wares stored at multiple levels of the warehouse, the warehouse path comprising:
        i. a level path at each level of the warehouse for accessing the wares in the level, each level path at each level comprising:
            1. a set of guide rails located in aisles of the warehouse, and
            2. a platform connecting the guide rails, and
        ii. a set of ramps for connecting the level paths;
    b. a plurality of robots to traverse on the warehouse path for accessing the wares, each of the plurality of robots having a handling means for handling the wares and a moving means for moving a robot along the warehouse path, wherein the moving means comprises;
        i. a first moving means for allowing movement on the platform of the warehouse path that is a plain surface;
        ii. a second moving means for allowing movement along the set of guide rails;

iii. wherein each of plurality of the robots is configured to shift between the first moving means and the second moving means based on one of the platform and the set of guiderails to be traversed;
c. a control unit for managing activities of the plurality of robots, the control unit having a route calculating module for calculating a route to be traversed by the robots on the ware-house path based on real-time status information of the warehouse, wherein the real-time status information relates to the wares, the robots, the status of the one or more lifts, the warehouse path, and inputs provided by a user;
d. a wireless communication network for enabling transfer of warehouse information between the plurality of robots and the control unit for operation of the robots, the warehouse information comprising the real-time status information; and
e. one or more lifts wherein each of the one or more lifts is connected to the control unit through a lift communication module via the wireless communication network, wherein the lift communication module is configured to share status of the lift with the control unit to compute the route.

2. The system according to claim 1, wherein the system further comprises:
a. an input module for enabling a user to feed information to the control unit;
b. a storage module for storing the warehouse information; and
c. means for interaction among the control unit, the input module and the storage module for sending, receiving and storing the warehouse information.

3. The system according to claim 1, wherein the handling means include:
a. means for picking a ware; and
b. means for releasing the ware subsequent to picking.

4. The system according to claim 1, wherein each of the robots further comprises a robot communicating module for sharing the warehouse information with the control unit through the wireless communication network.

5. The system according to claim 1, wherein the control unit further comprises an updating module for providing real-time warehouse information to the calculating module, the updating module receiving real-time warehouse information from the robots, and the lifts through the wireless communication network.

6. The system according to claim 1, wherein each of the robots further comprises a self-guided mobile module for guiding the movement of the robot on the warehouse path while traversing the best route communicated by the calculating module, wherein the self-guided mobile module uses object identification marks and RFID indicators to follow the route.

7. The system according to claim 1, wherein the first means is a set of ground wheels for travelling on ground surfaces.

8. The system according to claim 1, wherein the second means is a set of rail wheels for travelling on guide rails.

* * * * *